United States Patent [19]

von Alpen

[11] Patent Number: 4,713,305
[45] Date of Patent: Dec. 15, 1987

[54] WATER-FREE ORGANIC ELECTROLYTE

[75] Inventor: Ulrich von Alpen, Glashutten, Fed. Rep. of Germany

[73] Assignee: Varta Batterie A.G., Hanover, Fed. Rep. of Germany

[21] Appl. No.: 33,115

[22] Filed: Mar. 31, 1987

[30] Foreign Application Priority Data

Apr. 3, 1986 [DE] Fed. Rep. of Germany ....... 3611123

[51] Int. Cl.$^4$ ............................................. H01M 6/16
[52] U.S. Cl. .................................... 429/194; 429/197
[58] Field of Search ......................... 429/194, 196–199

[56] References Cited

U.S. PATENT DOCUMENTS 4,579,795 4/1986 Gray ............................... 429/197 X
4,612,265 9/1986 Connolly et al. ................ 429/198 X
4,643,958 2/1987 Thrash et al. ...................... 429/196

Primary Examiner—Anthony Skapars
Attorney, Agent, or Firm—Weiser & Stapler

[57] ABSTRACT

In galvanic high-energy cells with negative light-metal electrodes (e.g., Li) and electrolyte component solvents including ether with a CH bond activated by the neighboring groups —O—, =CO or =N, the formation of explosive peroxides is inhibited by adding stabilizer substances to the electrolyte in amounts of about 100 ppm. These stabilizer substances can include alkyl-substituted phenols, especially 2,6-di-tert-butyl-4-methylphenol, and readily oxidizable organosulfur and organophosphorus compounds such as trimethylphosphite. This permits safe handling of the cells, even under unusual operating conditions (e.g., prolonged overcharging at high current).

10 Claims, No Drawings

WATER-FREE ORGANIC ELECTROLYTE

BACKGROUND OF THE INVENTION

The present invention generally relates to a water-free organic electrolyte for galvanic cells with a negative light-metal electrode, particularly electrolytes which contain at least one organic solvent with a CH bond activated by an —O—, =CO or =N-neighboring group.

Solvents of this type are commonly found as an electrolyte component, especially in high-energy lithium cells. They are selected, on the one hand, because of their complete inertness to the highly reactive electrode material, and on the other hand, because of their good solvation capacity for inorganic salts.

The ether group has been found to satisfy these requirements to a high degree. Ethers are also designated as aprotic solvents because they do not yield protons, and therefore do not react with alkali metals. Instead, they behave as Lewis bases. The following are examples of ethers used in lithium cells: the aliphatic monoethers such as dimethyl ether, diethyl ether, diisopropyl ether and n-butyl ether, the aliphatic polyethers such as diethylene glycol dimethyl ether (DME), ethylene glycol diethyl ether and tetraethylene glycol dimethyl ether, and finally, cyclic ethers such as tetrahydrofuran, 1,4-dioxane and tetrahydropyran.

Other electrolyte solvents which may be used include butyrolactone and acetonitrile, for example.

Mixtures of several solvents are usually used in actual practice, especially when there is a need to compromise between, for example, the solubility of the conductive salt in the electrolyte solvent and the vapor pressure behavior, or when it is necessary to have a favorable viscosity (for which purpose, a $PC/LiClO_4$ electrolyte is diluted with DME, for example).

However, a broken CH bond in such organic liquids makes them receptive to the acceptance of oxygen. The ethers show an especially marked tendency to oxidize to nonvolatile peroxide. The resulting potential for explosion has proven to be a significant hindrance in handling ether-containing high energy cells.

Ether peroxides usually form from hydroperoxide, which initially arises from the cleavage of a CH bond next to the oxygen bridge of the ether molecule (which then incorporates $O_2$), and which subsequently decomposes into an unstable alkyl peroxide radical and an alcohol. The alkyl peroxide radicals then combine into corresponding peroxide polymers via a radical chain mechanism. Therefore, both hydroperoxide monomers and alkylidene peroxide polymers can be isolated from peroxide-containing ethers.

Related experience with exploded lithium cells (both in test and in actual use) has demonstrated that oxidation processes of this type also occur in the cells, despite hermetic sealing from the outside air. Very small amounts of oxygen can be formed in the cell by decomposition of oxygen-containing compounds such as $LiClO_4$, $CrO_x$ and $MnO_2$, or by electrolysis of residual $H_2O$ in the not completely water-free solvent. It is also possible for the cell to be contaminated by peroxide formed in the purification of the ether by distillation. All that is then needed to trigger an explosion is an unintentional energy source, which can be provided, for example, by a short circuit, with subsequent overheating of the cell, or by the action of light.

Previous measures attempting to protect against explosion have been directed (without specific reference to the present electrochemical system) either to completely avoiding the threat of explosion of the cell by an early interruption of current (e.g., by means of a fusible conductor element), or to moderate the power of the explosion, and thus its destructiveness, by mechanical measures. The latter can be achieved, for example, by valve designs in which a deformable ball is mounted in a matching opening in the area of the cell cover to normally provide a seal, but so that when a maximum permissible internal pressure is exceeded, the ball deforms irreversibly and creates an opening.

SUMMARY OF THE INVENTION

The principal objective of the present invention is to develop a means for reducing the danger of explosion of lithium batteries which can arise when using an organic electrolyte of the type previously described.

This and other objectives are achieved in accordance with the present invention by treating the electrolyte with a stablizer substance that prevents the formation of polymeric peroxides and/or causes the decomposition of peroxides which are already present. Further detail regarding such stabilizer substances may be had with reference to the detailed description which follows.

DETAILED DESCRIPTION OF PREFERRED EMBODIMENTS

Agents which are especially effective in preventing chemical changes in the solvents in question include substituted phenols, preferably alkyl-substituted phenols selected from the following group: 2,6-di-tert-butyl-4-methylphenol, 2,4,6-tri-tert-butylphenol, 2,2'-methylene-bis-(4-methyl-6-tert-butylphenol), 2,2'-isobutylidene-bis-(4,6-dimethylphenol), 4,4'-butylidene-bis-(2-tert-butyl-5-methylphenol), 4,4'-thio-bis-(2-tert-butyl-5-methylphenol). Also effective are polynuclear phenols which are sterically hindered, and mixtures of sterically hindered styrolized phenols.

In addition to these specified phenol derivatives, the polymerized form of a quinoline derivative, 2,2,4-trimethyl-1,2-dihydroquinoline, also has a positive effect with respect to the prevention of explosion.

Most of these products can basically be understood as methylphenol derivatives. However, all of these phenols are more or less sterically hindered by additional substituents, which means that they are more stable and oxidize less readily than nonsubstituted phenols. This also means lesser reactivity toward the lithium electrode, which is also an important aspect of the present invention.

The above-listed substituted phenols can also be grouped under the name "phenolic antioxidants". However, this is not to be taken as a description of the specific mechanism by which such substituents enter into the reactivity of the cell, and in one way or another prevent the danger of an ether peroxide explosion.

Another group of substances that is very suitable for stabilizing the electrolyte comprises low-valent organic sulfur or phosphorus compounds, which are more readily oxidizable, and to that extent less stable, than the substituted phenols. However, their mechanism as antioxidants is all the more understandable for that reason. Representative members of this group include 4,4'-thio-bis-(2-tert-butyl-5-methylphenol), trimethylphosphite, triphenylphosphite and tris-nonylphenylphosphite. The phosphorus-containing compounds include a subgroup that can be designated as "phosphitic antioxidants". The thio compound 4,4'-thio-bis-(2-tert-butyl-5-methylphenol) is therefore an example, in accordance with the present invention, of both the initially mentioned group of substituted phenols and the above-mentioned group of sulfur and phosphorus compounds.

Finally, yet another stabilizer substance in accordance with the present invention is tetracyanoethylene.

The concentration of the stabilizer used should be in the range of 10 mg to 10 g/kg solvent, preferably 100 mg/kg solvent (i.e., 100 ppm).

In testing, test series of fresh lithium cells of a nominal capacity of 1 Ah were overcharged with a current of 100 mA for about 10 hours. The electrolyte system was comprised of diethylene glycol dimethyl ether/propylene carbonate/LiClO$_4$ with CrO$_x$ as the depolarizer substance. 2,6-Di-tert-butyl-4-methylphenol was added to the electrolyte in an amount of 100 mg/1000 g solvent. It was found that overcharging for more than 18 hours at a charging voltage of 40 volts could be performed without problems developing, whereas the same cells without this additive had to be taken out of the test due to explosions after only 30 minutes.

At charging voltages lowered to 24 volts and 12 volts, there were no failures of fresh lithium cells due to explosions in the overcharging test up to 144 hours. However, there were isolated failures (10% failure rate) of cells which previously had been 30% discharged. Absolutely no danger of explosion was discovered at a charging voltage of 6 volts, which is the customary charging voltage used in practice. These findings indicate that the charging time can be extended by a factor of more than ten as compared with nonstabilized cells.

Moreover, no change in the electrolyte conductivity at room temperature, and no reduction of capacity utilization, were found in the cells treated with a stabilizer.

These results, and experimental results with other concentrations of the additive, indicated that the stabilizer substances of the present invention are effective in ensuring that there is no acute danger of explosion of high-energy cells, even beyond their normal operating conditions.

Without wishing to be bound by the following explanation, the chemical mechanism which provides these improvements is believed to be that among the stabilizer substances of the invention there are those which are capable of forming radicals that are more stable than the alkyl peroxide radicals that arise from ether hydroperoxides, as mentioned previously. This is certainly the case with the substituted phenols such as 2,6-di-tert-butyl-4-methylphenol. These more stable radicals become incorporated in the radical chain of the ether peroxide polymerization and thus cause immediate termination of the polymerization because of their stability. As a result, the explosive peroxide polymer does not form. The stabilizer substance functions as a radical inhibitor or "radical collector".

The stabilizer substance, by its mere presence, can cause the decomposition of previously formed hydroperoxides or other peroxides that may be present. Further reaction to the peroxide polymer is thus blocked from the very start, and the danger of explosion is eliminated. The stabilizer substance also functions as a decomposition catalyst without itself undergoing any change. It is primarily the phosphitic antioxidants that work in this way, while 4,4'-thio-bis-(2-tert-butyl-5-methylphenol) has a dual role as radical inhibitor and peroxide decomposer due to its dual nature as a methylphenol derivative and as a low-valent thio compound.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. In a water-free organic electrolyte for galvanic cells with a negative light-metal electrode, which electrolyte contains at least one organic solvent with a CH bond activated by an —O—, =CO or =N-neighboring group, the improvement wherein a stabilizer substance is added to the electrolyte to prevent formation of polymeric peroxides or to destroy peroxides that are present.

2. The electrolyte of claim 1 wherein the stabilizer substance is a substituted phenol.

3. The electrolyte of claim 2 wherein the stabilizer substance is an alkyl-substituted phenol selected from the group consisting of 2,6-di-tert-butyl-4-methylphenol, 2,4,6-tri-tert-butylphenol, 2,2'-methylene-bis-(4-methyl-6-tert-butylphenol), 2,2'-iso-butylidene-bis-(4,6-dimethylphenol), 4,4'-butylidene-bis-(2-tert-butyl-5-methylphenol) and 4,4'-thio-bis-(2-tert-butyl-5-methylphenol).

4. The electrolyte of claim 2 wherein the stabilizer substance is a sterically hindered polynuclear phenol or a mixture of sterically hindered styrolized phenols.

5. The electrolyte of claim 1 wherein the stabilizer substance is 2,2,4-trimethyl-1,2-dihydroquinoline.

6. The electrolyte of claim 1 wherein the stabilizer substance is a readily oxidized low-valent organosulfur or organophosphorus compound.

7. The electrolyte of claim 6 wherein the stabilizer substance is selected from the group consisting of 4,4'-thio-bis-(2-tert-butyl-5-methylphenol), trimethylphosphite, triphenylphosphite and tris-nonylphenylphosphite.

8. The electrolyte of claim 1 wherein the stabilizer substance is tetracyanoethylene.

9. The electrolyte of claim 1 wherein the concentration of the stabilizer substance is from 10 mg to 1000 mg/kg solvent.

10. The electrolyte of claim 9 wherein the concentration is about 100 mg/kg solvent.

* * * * *